(12) United States Patent
Perneti et al.

(10) Patent No.: US 11,995,600 B2
(45) Date of Patent: May 28, 2024

(54) SYSTEM AND METHOD FOR GEOFENCE BASED CYCLE TIME DETERMINATION

(71) Applicant: Caterpillar Inc., Peoria, IL (US)

(72) Inventors: Karthik Perneti, Chennai (IN); Sriram Somasuntharam, Chennai (IN); Umasri Devireddy, Chennai (IN)

(73) Assignee: Caterpillar Inc., Peoria, IL (US)

( * ) Notice: Subject to any disclaimer, the term of this patent is extended or adjusted under 35 U.S.C. 154(b) by 330 days.

(21) Appl. No.: 16/826,411

(22) Filed: Mar. 23, 2020

(65) Prior Publication Data
US 2021/0295257 A1 Sep. 23, 2021

(51) Int. Cl.
| | |
|---|---|
| *G06Q 10/0833* | (2023.01) |
| *G06Q 10/087* | (2023.01) |
| *H04W 4/021* | (2018.01) |
| *H04W 4/44* | (2018.01) |

(52) U.S. Cl.
CPC ....... *G06Q 10/0833* (2013.01); *G06Q 10/087* (2013.01); *H04W 4/021* (2013.01); *H04W 4/44* (2018.02)

(58) Field of Classification Search
CPC ... G06Q 10/0833; G06Q 10/087; H04W 4/44; H04W 4/021
USPC ......................................................... 705/333
See application file for complete search history.

(56) References Cited

U.S. PATENT DOCUMENTS

| | | | |
|---|---|---|---|
| 6,611,755 B1 * | 8/2003 | Coffee ................... | B28C 5/422 340/438 |
| 6,766,244 B2 | 7/2004 | Obata et al. | |
| 6,917,300 B2 * | 7/2005 | Allen ....................... | G08G 1/20 340/539.13 |
| 8,417,538 B2 | 4/2013 | Tessier | |
| 8,531,293 B2 | 9/2013 | Putz | |
| 8,942,725 B2 | 1/2015 | Marti et al. | |
| 9,002,368 B2 | 4/2015 | Treu et al. | |
| (Continued) | | | |

FOREIGN PATENT DOCUMENTS

| | | |
|---|---|---|
| JP | 5006119 | 1/2009 |
| WO | 2011022412 A1 | 2/2011 |

OTHER PUBLICATIONS

Khalil El-Moslmani, Fleet Selection for Earthmoving Operations using Queueing Method, May 2002, 1-20 (Year: 2002).*

(Continued)

*Primary Examiner* — A. Hunter Wilder
*Assistant Examiner* — Joseph M Mutschler

(57) ABSTRACT

A method includes an operation of receiving first position information, indicative of a first material plant checkpoint in which an equipment enters a first material plant geofence a first time. The method also includes receiving second position information, indicative of a first machine checkpoint in which the equipment enters and/or exits a machine geofence. The method also includes receiving third position information, indicative of a second material plant checkpoint in which the equipment enters the first material plant geofence a second time. The method also includes creating an association between the first material plant checkpoint and the second material plant checkpoint. The method also includes determining the equipment cycle time based at least partly on a time associated with the first material plant checkpoint and a time associated with the second material plant checkpoint.

7 Claims, 7 Drawing Sheets

(56) References Cited

U.S. PATENT DOCUMENTS

| | | |
|---|---|---|
| 9,222,781 B2 | 12/2015 | Schenken et al. |
| 9,313,616 B2 | 4/2016 | Mitchell et al. |
| 9,330,287 B2 | 5/2016 | Graczyk et al. |
| 9,591,444 B2 | 3/2017 | Qiu |
| 9,928,477 B2 | 3/2018 | Wallace |
| 9,939,311 B2 | 4/2018 | Stanley et al. |
| 9,998,866 B2* | 6/2018 | Natucci, Jr. ............ H04W 4/022 |
| 10,345,427 B2 | 7/2019 | Barrau et al. |
| 10,375,515 B2 | 8/2019 | Jensen et al. |
| 2011/0309935 A1 | 12/2011 | Emmett et al. |
| 2012/0242470 A1* | 9/2012 | Morgan ................. G06Q 50/30 340/426.19 |
| 2014/0337123 A1 | 11/2014 | Nuernberg et al. |
| 2016/0048795 A1* | 2/2016 | Walton ........... G06Q 10/063114 705/7.15 |
| 2016/0053460 A1 | 2/2016 | Singh |
| 2017/0228108 A1 | 8/2017 | Marsolek |
| 2019/0073629 A1 | 3/2019 | Becica |
| 2019/0137617 A1 | 5/2019 | Chapuis et al. |
| 2019/0188620 A1 | 6/2019 | Marsolek et al. |
| 2020/0318987 A1* | 10/2020 | Soderberg ............ G01C 21/3697 |
| 2021/0099828 A1* | 4/2021 | Hanna .................... H04W 4/021 |
| 2021/0266697 A1* | 8/2021 | Rauhala ................ H04W 4/029 |

OTHER PUBLICATIONS

Khalil El-Moslmani, Fleet Selection for Earthmoving Operations using Queueing Method, May 2002, 21-40 (Year: 2002).*
Khalil El-Moslmani, Fleet Selection for Earthmoving Operations using Queueing Method, May 2002, 41-60 (Year: 2002).*
Khalil El-Moslmani, Fleet Selection for Earthmoving Operations using Queueing Method, May 2002, 61-80 (Year: 2002).*
Khalil El-Moslmani, Fleet Selection for Earthmoving Operations using Queueing Method, May 2002, 81-100 (Year: 2002).*
Khalil El-Moslmani, Fleet Selection for Earthmoving Operations using Queueing Method, May 2002, 101-120 (Year: 2002).*
Khalil El-Moslmani, Fleet Selection for Earthmoving Operations using Queueing Method, May 2002, 121-140 (Year: 2002).*
Khalil El-Moslmani, Fleet Selection for Earthmoving Operations using Queueing Method, May 2002, 141-162 (Year: 2002).*

* cited by examiner

| Transition | 1-2 to 1-3 <u>202</u> | 1-3 to 2-1 <u>204</u> | E.g., 2-2 to 2-3 <u>206</u> | 2-5 to 3-1 <u>208</u> | E.g., 3-1 to 3-2 <u>210</u> | 3-4 to 4-1 <u>212</u> | E.g., 4-3 to 4-4 <u>214</u> | 4-5 to 5-1 <u>216</u> |
|---|---|---|---|---|---|---|---|---|
| Current | W/i Plant GF 104 | 1st Instance Outside Plant GF 104 | In transit | First Instance Inside Machine GF 106 | W/i Machine GF 106 | 1st Instance Outside Machine GF 106 | In transit | 1st Instance Inside Plant GF 104 |
| Previous | W/i Plant GF 104 | W/i Plant GF 104 | Outside Plant GF 104 and Machine GF 106 | Outside Plant GF 104 and Machine GF 106 | W/i Machine GF 106 | W/i Machine GF 106 | Outside Plant GF 104 and Machine GF 106 | Outside Plant GF 104 and Machine GF 106 |
| Subsequent | W/i Plant GF 104 | Outside Plant GF 104 | Outside Plant GF 104 and Machine GF 106 | Inside Machine GF 106 | W/i Machine GF 106 | Outside Machine GF 106 | Outside Machine GF 106 | W/i Plant GF 104 |
| Status | Discard | Record exit from Plant GF 104 | Discard | Record entry into Machine GF 106 | Discard | Record exit from Machine GF 106 | Discard | Record entry to Plant GF 104 |

SYSTEM AND METHOD FOR GEOFENCE BASED CYCLE TIME DETERMINATION

TECHNICAL FIELD

The present disclosure relates to a system and methodology for determining haul-truck or other equipment performance, via performance metrics. For example, performance of a haul truck is monitored as the haul truck hauls material from a material plant to a project site. More specifically, the present disclosure relates to a system and methodology for determining haul truck or other equipment cycle time.

BACKGROUND

Haul-truck cycle time is one indicator of operational efficiency for a paving or other construction project that utilizes materials hauled from a material plant to a machine at a project worksite. Accurately determined haul-truck cycle times can help in estimating haul-truck resource allocation to a given project, as well as improving the ability to coordinate haul truck resources at the project worksite. These are just some of the benefits of being able to accurately determine haul-truck cycle times.

Traditional approaches to determining haul-truck cycle time consider the time it takes a haul-truck to travel between a material plant and a machine at a project site.

Example embodiments of the present disclosure are directed toward overcoming the deficiencies of such systems.

SUMMARY

In an aspect of the present disclosure, a method includes an operation of receiving first position information, indicative of a first material plant checkpoint in which a haul-truck enters a geofence surrounding a first material plant (first material plant geofence) a first time. The method also includes receiving second position information, indicative of a first machine checkpoint in which the haul-truck enters and/or exits a geofence surrounding a machine, such as a paving machine (machine geofence). The method also includes receiving third position information, indicative of a second material plant checkpoint in which the haul-truck enters the first material plant geofence a second time. The method also includes creating an association between the first material plant checkpoint and the second material plant checkpoint. The method also includes determining the haul-truck cycle time based at least partly on a time associated with the first material plant checkpoint and a time associated with the second material plant checkpoint.

In another aspect of the present disclosure, a device comprises one or more processors and memory coupled to the one or more processors. The memory stores instructions executable by the one or more processors to perform operations including receiving first position information, indicative of a first material plant checkpoint in which a haul-truck enters a first material plant geofence a first time. The operations also include receiving second position information, indicative of a first machine checkpoint in which the haul-truck enters and/or exits a machine geofence. The operations also include receiving third position information, indicative of a second material plant checkpoint in which the haul-truck enters the first material plant geofence a second time. The operations also include creating an association between the first material plant checkpoint and the second material plant checkpoint. The operations also include determining a haul-truck cycle time based at least partly on a time associated with the first material plant checkpoint and a time associated with the second material plant checkpoint.

In yet another aspect of the present disclosure, one or more computer-readable media stores instructions that, when executed by one or more processors of a device, configure the device to perform operations including receiving first position information, indicative of a first material plant checkpoint in which a haul-truck enters a first material plant geofence a first time. The operations also include receiving second position information, indicative of a first machine checkpoint in which the haul-truck enters and/or exits a machine geofence. The operations also include receiving third position information, indicative of a second material plant checkpoint in which the haul-truck enters the first material plant geofence a second time. The operations also include creating an association between the first material plant checkpoint and the second material plant checkpoint. The operations also include determining a haul-truck cycle time based at least partly on a time associated with the first material plant checkpoint and a time associated with the second material plant checkpoint.

BRIEF DESCRIPTION OF DRAWINGS

FIG. 2 is an example data structure that a processor may use to track a haul-truck and from which the processor may determine a haul-truck cycle time.

DETAILED DESCRIPTION

Wherever possible, the same reference numbers will be used throughout the drawings to refer to same or like parts.

Figure 1:
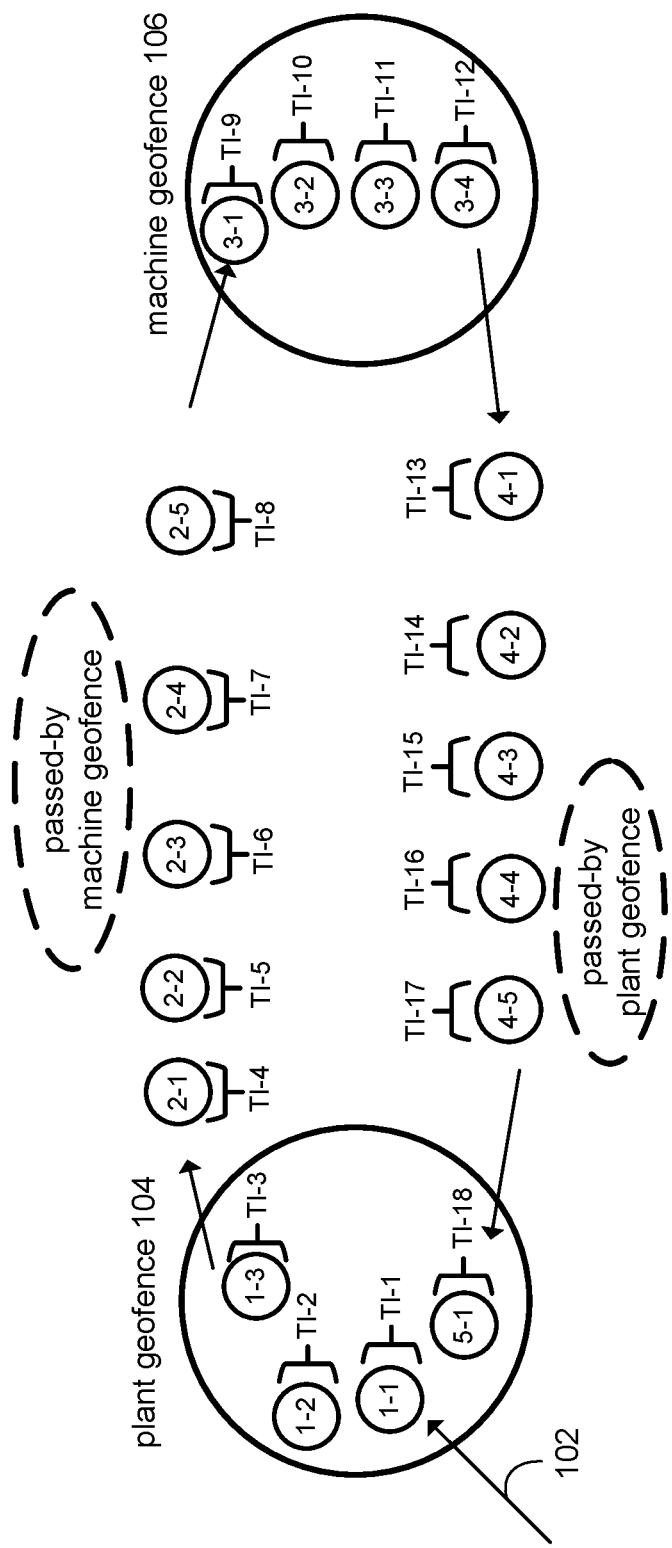
FIG. 1 is a diagram illustrating an example of how a haul-truck cycle may be identified.

FIG. 1 is a diagram illustrating an example of how a processor may identify a haul-truck cycle. The processor obtains an indication of where the haul-truck is located at various times. The processor determines, from the indicated positions, whether the haul-truck has entered and/or exited various geofences. By creating an association between a first plant geofence entry and exit by a haul-truck and second plant geofence entry and exit by the same haul-truck, the processor may determine a cycle time for the haul-truck. Moreover, the processor may utilize tickets associated with the corresponding plant geofence entries and exits to determine the haul-truck cycle time.

A plant, such as material plant, is typically where a haul-truck obtains material (such as paving material) for use by a machine at a project worksite or for transfer to a different material plant. That is, the haul-truck obtains the material at the material plant and then transports the material to the machine at the project worksite or to the different material plant. The haul-truck may then return to the first material plant, typically to obtain additional material to take to a machine at the same or a different project worksite or to the different material plant or to even yet another material plant.

A portion of the material plant may be indicated by the contours of a geofence surrounding the plant. A geofence is a virtual perimeter for a tangible geographic area. A static geofence can be confined to a fixed boundary, such as a fixed boundary around a material plant. Alternatively, a dynamic geofence may be generated, to circumscribe the area covering a specified radial distance from a center point location that is in motion. For example, a dynamic geofence can be created around a paving machine that is in motion. As the machine moves, the position of the geofence surrounding the machine moves in correspondence with the movement of the machine.

Referring to FIG. 1, an arrow 102 denotes a first entry by a haul-truck into a plant geofence 104 to a position denoted by 1-1 at time interval TI-1. A processor may determine the position of the haul-truck at time interval TI-1 to be the position denoted by 1-1 based on information obtained, for example, using a Global Positioning System (GPS). For example, the processor may periodically receive a GPS signal and determine the position of the haul-truck based on a position indication in the GPS signal. For example, the GPS signal may indicate a latitude and longitude position of the haul-truck. Furthermore, the processor may compare the determined haul-truck position to known geofence positions, to determine whether the haul-truck position is within or outside any particular geofence known to the processor. For example, the processor may determine the haul-truck to be at the position 1-1 at time interval TI-1 and, by comparing the position 1-1 to a known position of the plant geofence 104, the processor may determine the haul-truck at position 1-1 to be within the plant geofence 104.

Referring still to FIG. 1, the haul-truck is moving within the plant geofence 104. Subsequently, based on the motion of the haul truck, the processor determines the haul-truck to be at position 1-2 at time interval TI-2. Then another time the processor determines the position of the haul-truck, at time interval TI-3, the processor determines the haul-truck to be at position 1-3. The processor determines, by comparing each of position 1-2 and 1-3 to the position of the plant geofence 104, that the haul-truck is within the plant geofence 104. In another example, the processor at certain time intervals ascertains the location of the haul-truck. For example, at a first time interval TI-1, the processor may ascertain the location of the haul-truck as being position 1-1; at a second time interval TI-2, the processor may determine the location of the haul-truck as being position 1-2; and at a third time interval TI-3, the processor may ascertain the location of the haul-truck as being position 1-3. After comparing each of the locations with the boundary/area of plant geofence 104, the processor may determine that the haul truck is within the plant geofence 104.

However, at a next time interval TI-4, when the processor determines the position of the haul-truck, the processor determines the haul-truck to be at position 2-1. By comparing the determined current position 2-1 and determined previous position 1-3 of the haul-truck to a known area of the plant geofence 104, the processor may determine not only that the haul-truck is outside the plant geofence 104, but the processor may also determine that the haul-truck has exited the plant geofence 104. When a previous position is within a geofence and the next position is within the geofence, the processor determines the haul-truck is within the geofence. When the previous position is within the geofence and the next position is outside the geofence, the processor determines the haul-truck has exited the geofence. When the previous position is outside the geofence and the next position is outside the geofence, the processor determines the haul-truck is in transit. When the previous position is outside the geofence and the next position is within the geofence, the processor determines the haul-truck has entered the geofence. When the previous position is within the geofence and the next position is outside the geofence, the processor determines the haul-truck has exited the geofence.

As seen in FIG. 1, the position 1-3 is within the plant geofence 104 and position 2-1 is outside the plant geofence 104 Accordingly, as the haul-truck moved from position 1-3 to position 2-1 the processor may determine that the haul-truck has exited the plant geofence 104.

As the haul-truck travels towards a machine at a project worksite to deliver material, the processor continues to determine and process the position of the haul-truck at various time intervals as indicated, for example, in the received GPS signal. Referring still to FIG. 1, the processor determines, at time interval TI-4, the position of the haul-truck to be position 2-1. Likewise at time intervals TI-5, TI-6, TI-7 and TI-8, the processor determines the position of the haul-truck to be at position 2-2, 2-3, 2-4 and 2-5, respectively. At time interval TI-9, the processor determines the position of the haul-truck to be position 3-1.

Each time the processor determines the position of the haul-truck, the processor may compare the determined position to known geofences, to determine whether the haul-truck position is within or outside a geofence. Furthermore, the processor may compare a status of the haul-truck at a particular position, as being within or outside a geofence to a status of the haul-truck at a previous position. Based on a result of the comparison, the processor may determine whether the haul-truck has entered or exited a geofence. For example, if the processor determines the status of the haul-truck to be outside a geofence and the status of the haul-truck at a previous position to be within the geofence, then the processor may determine the haul-truck has exited the geofence between the previous position and the current position. As another example, if the processor determines the status of the haul-truck to be within a geofence and the status of the haul-truck at a previous position to be outside the geofence, then the processor may determine the haul-truck has entered the geofence between the previous position and the current position.

When the processor determines the current position of the haul-truck to be position 3-1 at time interval TI-9 and the corresponding status to be within the machine geofence 106, and a previous position of the haul-truck at time interval TI-8 to be position 2-5 and the corresponding status to be outside the machine geofence 106, the processor may determine that the haul-truck has entered the machine geofence 106 between the position 2-5 and the position 3-1.

Referring still to FIG. 1, as the haul-truck continues to travel within the machine geofence 106, the processor next determines the haul-truck at time interval TI-10 to be at position 3-2, then at position 3-3 at time interval TI-11, and then at position 3-4 at time interval TI-12. The processor determines the haul-truck to next be at position 4-1, at time interval TI-13. When the processor determines the current position of the haul-truck to be position 4-1 and the corresponding status to be outside the machine geofence 106, and a previous position of the haul-truck to be position 3-4 and the corresponding status to be inside the machine geofence 106, the processor may determine that the haul-truck has exited the machine geofence 106 between the position 3-4 and 4-1.

As the haul-truck continues to travel, the processor continues to determine and process the position of the haul-truck. Referring still to FIG. 1, the processor determines the position of the haul-truck to be position 4-2 at time interval TI-14, then position 4-3 at time interval TI-15, then position 4-4 at time interval TI-16, and then position 4-5 at time interval TI-17. Yet another time the processor determines the position of the haul-truck, at time interval TI-18, the processor determines the position of the haul-truck to be position 5-1. Due to the status of the haul-truck being outside the plant geofence 104 at position 4-5 and inside the plant geofence 104 at position 5-1, the processor may determine that the haul-truck has entered the plant geofence 104 between the position 4-5 and the position 5-1.

FIG. 2 is an example data structure 200 that the processor may utilize to record and process haul-truck positions and statuses. The data structure can be an array or a linked list. Each column 202, 204, . . . , 216 is a node of the data structure 200. Each row indicates an attribute of the node. The example data structure 200 may be, for example, a dynamic linked-list data structure though, in FIG. 2, links from record to record are not shown. A node indicates a record used to store several attributes of a given record.

Referring still to the FIG. 2 example data structure, the processor utilizes the column 202 to record and process a haul-truck position transition from position 1-2 (FIG. 1) to position 1-3. In the column 202 record, the processor has recorded the current position of the haul-truck (position 1-3) as being within the plant geofence 104. The processor has also recorded the previous position of the haul-truck (position 1-2) as being within the plant geofence 104, and the processor has recorded the subsequent position (position 1-3, which is the same as the current position) as being within the plant geofence 104. With regard to the status portion of the record 202, the processor has recorded the status as "discard." That is, because the previous position and subsequent position are both within the plant geofence 104, the haul-truck has not made any transition relative to exiting a geofence. The column 202 record is not needed for the processor to determine the haul-truck cycle time, and the processor may discard it.

Referring still to the FIG. 2 example data structure 200, the processor utilizes the column 204 record to record and process a haul-truck position transition from position 1-3 to position 2-1. In the column 204 record, the processor has recorded the current position of the haul-truck (position 2-1) as being the first instance outside the plant geofence 104. The processor has recorded the previous position of the haul-truck, in column 204, as being within the plant geofence 104. Furthermore, the processor has recorded the subsequent position of the haul-truck, in column 204, as being outside the plant geofence 104. Because the processor has determined the current position of the haul-truck to be the first instance of the haul-truck being outside the plant geofence 104, the processor records the status in column 204 as being an exit from the plant geofence 104.

The processor uses the column 206 to record and process a haul-truck transition from position 2-2 to position 2-3. In the column 206 record, the processor has recorded the current position of the haul-truck (position 2-3) as being in transit. In the column 206 record, the processor has recorded the previous position of the haul truck as being outside the plant geofence 104 and also outside the machine geofence 106. Furthermore, in the column 206 record, the processor has recorded the subsequent position of the haul-truck as also being outside the plant geofence 104 and also outside the machine geofence 106. As a result, in the status position of the column 206, the processor has recorded the status as "discard," since the column 206 record is not needed for the processor to determine the haul-truck cycle time. For example, if the data structure 200 is a linked list, then to optimize valuable system resources, the memory associated with the column 206 record may be released and the data structure 206 otherwise modified to no longer link to the column 206.

Referring still to FIG. 2, the processor utilizes the column 208 to record and process a haul-truck transition from position 2-5 to position 3-1. In the column 208 record, the processor has recorded the current position of the haul-truck (position 3-1) has being the first instance of the haul-truck being inside the machine geofence 106. The processor has recorded the previous position of the haul-truck, in column 208, as being outside the plant geofence 104 and outside the machine geofence 106.

Furthermore, the processor has recorded the subsequent position of the haul-truck, in column 208, as being inside the machine geofence 106. Because the processor has determined the current position of the haul-truck to be the first instance of the haul-truck being inside the machine geofence 106, the processor records the status in column 208 as being an entrance to the machine geofence 106.

In the column 210 record, the processor has recorded the current position of the haul-truck (position 3-2) as being within the machine geofence 106. The processor has also recorded the previous position of the haul-truck (position 3-1) as being within the machine geofence 106, and the processor has recorded the subsequent position (position 3-2, which is the same as the current position) as being within the machine geofence 106. With regard to the status portion of the record 210, the processor has recorded the status as "discard." That is, because the previous position and subsequent position are both within the machine geofence 106, the haul-truck has not made any transition relative to a geofence. Thus, the column 210 record is not needed for the processor to determine the haul-truck cycle time.

Referring still to the FIG. 2 example data structure 200, the processor utilizes the column 212 to record and process a haul-truck position transition from position 3-4 to position 4-1. In the column 212 record, the processor has recorded the current position of the haul-truck (position 4-1) as being the first instance outside the machine geofence 106. The processor has recorded the previous position of the haul-truck, in column 212, as being within the machine geofence 106. Furthermore, the processor has recorded the subsequent position of the haul-truck, in column 212, as being outside the machine geofence 106. Because the processor has determined the current position of the haul-truck to be the first instance of the haul-truck being outside the machine geofence 106, the processor records the status in column 212 as being an exit from the machine geofence 106.

The processor uses the column 214 to record and process a haul-truck transition from position 4-3 to position 4-4. In the column 214 record, the processor has recorded the current position of the haul-truck (position 4-4) as being in transit. In the column 214 record, the processor has recorded the previous position of the haul truck as being outside the plant geofence 104 and also outside the machine geofence 106. Furthermore, in the column 214 record, the processor has recorded the subsequent position of the haul-truck as also being outside the plant geofence 104 and also outside the machine geofence 106. As a result, in the status position of the column 214, the processor has recorded the status as "discard" since it does not indicate a transition relative to a geofence. The column 214 record is not needed for the processor to determine the haul-truck cycle time.

Referring still to the FIG. 2 example data structure 200, the processor utilizes the column 216 to record and process a haul-truck position transition from position 4-5 to position 5-1. In the column 216 record, the processor has recorded the current position of the haul-truck (position 5-1) as being the first instance inside the plant geofence 104. The processor has recorded the previous position of the haul-truck, in column 216, as being outside the plant geofence 104 and outside of machine geofence. Furthermore, the processor has recorded the subsequent position of the haul-truck, in column 216, as being inside the plant geofence 104. Because the processor has determined the current position of the haul-truck to be the first instance of the haul-truck being inside the plant geofence 104, the processor records the status in column 216 as being an entry to the plant geofence 104.

Figure 3:
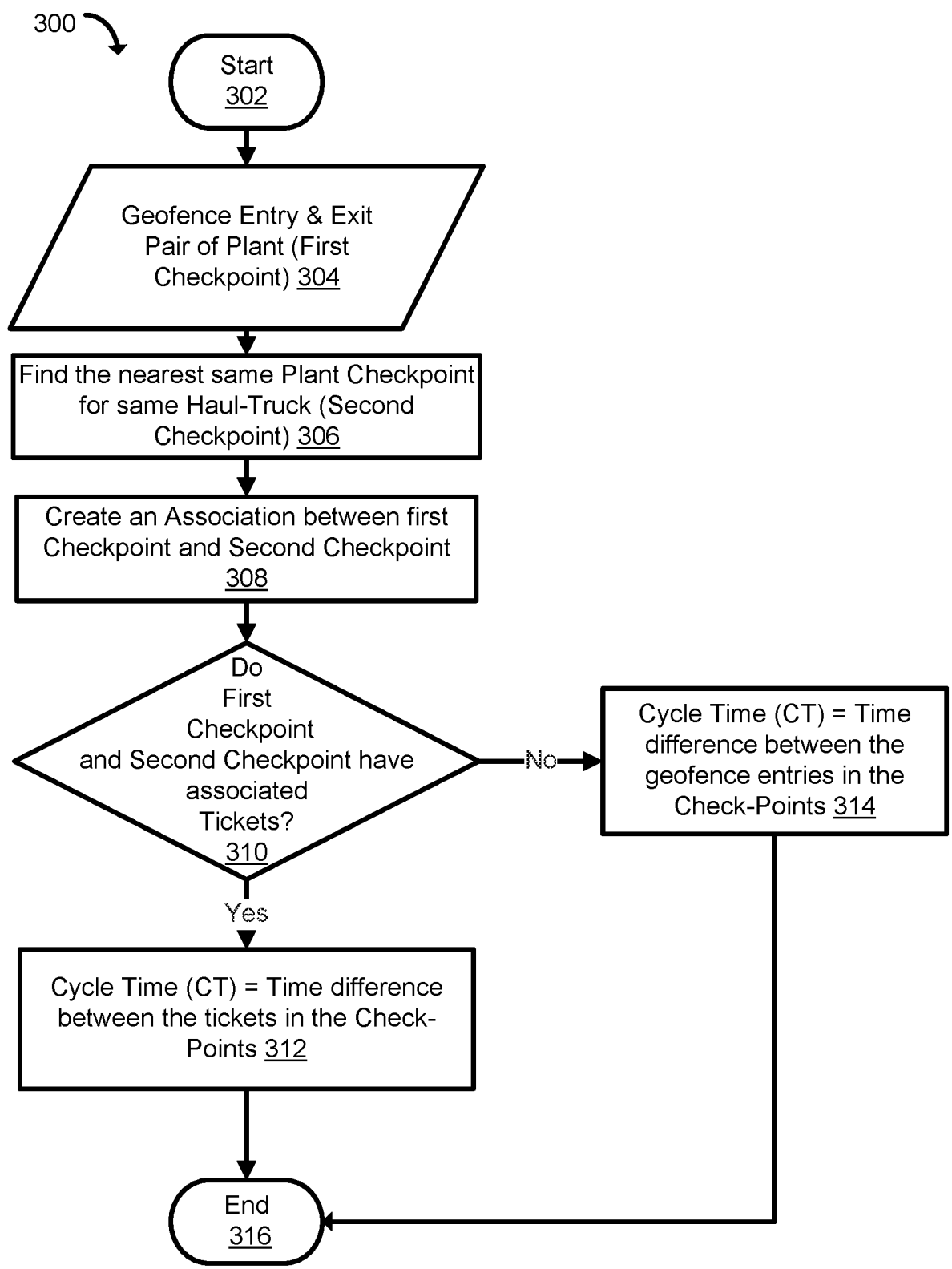
FIG. 3 is a flowchart illustrating an example method a processor may use to determine a haul-truck cycle, from a plant checkpoint to a machine checkpoint and back to a plant checkpoint.

FIG. 3 is a flowchart illustrating a process 300 by which the processor may determine a haul-truck cycle time, such as by processing a data structure such as the FIG. 2 example data structure 200. The process 300 begins at 302. At 304, the processor finds an entry/exit pair (column 216/204) for a plant geofence (such as the plant geofence 104), referred to herein as a checkpoint. For example, with respect to the example data structure 200, the processor may process the records 202, 204, . . . , 216 to identify a column (216) for an entrance to the plant geofence 104 and a column (204) for a corresponding exit from the plant geofence 104. The pair of records are for a first checkpoint. In some examples, such as at the beginning of a day, the haul-truck may have remained parked within the plant geofence for a sustained period of time. In one example, the next trip cycle time may be indicated as invalid for productivity calculations (such as average cycle time for the haul truck) if the time the haul truck remains within the plant geofence is, for example, greater than six hours. However, the user may be able to view segments times for the trip, such as hauling time to paver, in paver, towards plant and in plant times).

At 306, the processor finds the nearest (in time) checkpoint for the same haul-truck for the same plant. For example, with respect to the FIG. 2 example data structure 200, the processor may identify the columns 216 as being for the next entry to the plant geofence 104 and a subsequent column (not shown) as being for the corresponding exit from the plant geofence 104. The pair of records are for a second checkpoint. At 308, the processor creates an association between the first checkpoint and the second checkpoint such as, for example, by storing an indication of the second checkpoint reference value (e.g., identification of the second checkpoint) in association with the first checkpoint.

At 310, the processor determines if the first checkpoint and the second checkpoint have corresponding tickets. A ticket may include, for example, an indication of a time that a material load is picked up at a material plant and other information about the material load, such as amount of material, type of material, identification of the truck, etc.

If the processor determines at 310 that the first checkpoint and the second checkpoint have associated tickets then, at 312, the processor determines the haul-truck cycle time based on the times indicated by the corresponding tickets. This may include, for example, determining a difference between times indicated in the tickets. If the processor determines at 310 that at least one of the first checkpoint and the second checkpoint do not have associated tickets then, at 314, the processor determines the haul-truck cycle time based on a time difference between the geofence entries in the checkpoints. In other examples, a different time associated with a checkpoint may be utilized, such as an average of the geofence entry and exit times, or the exit times alone. At 316, the process 300 ends.

Figure 4:
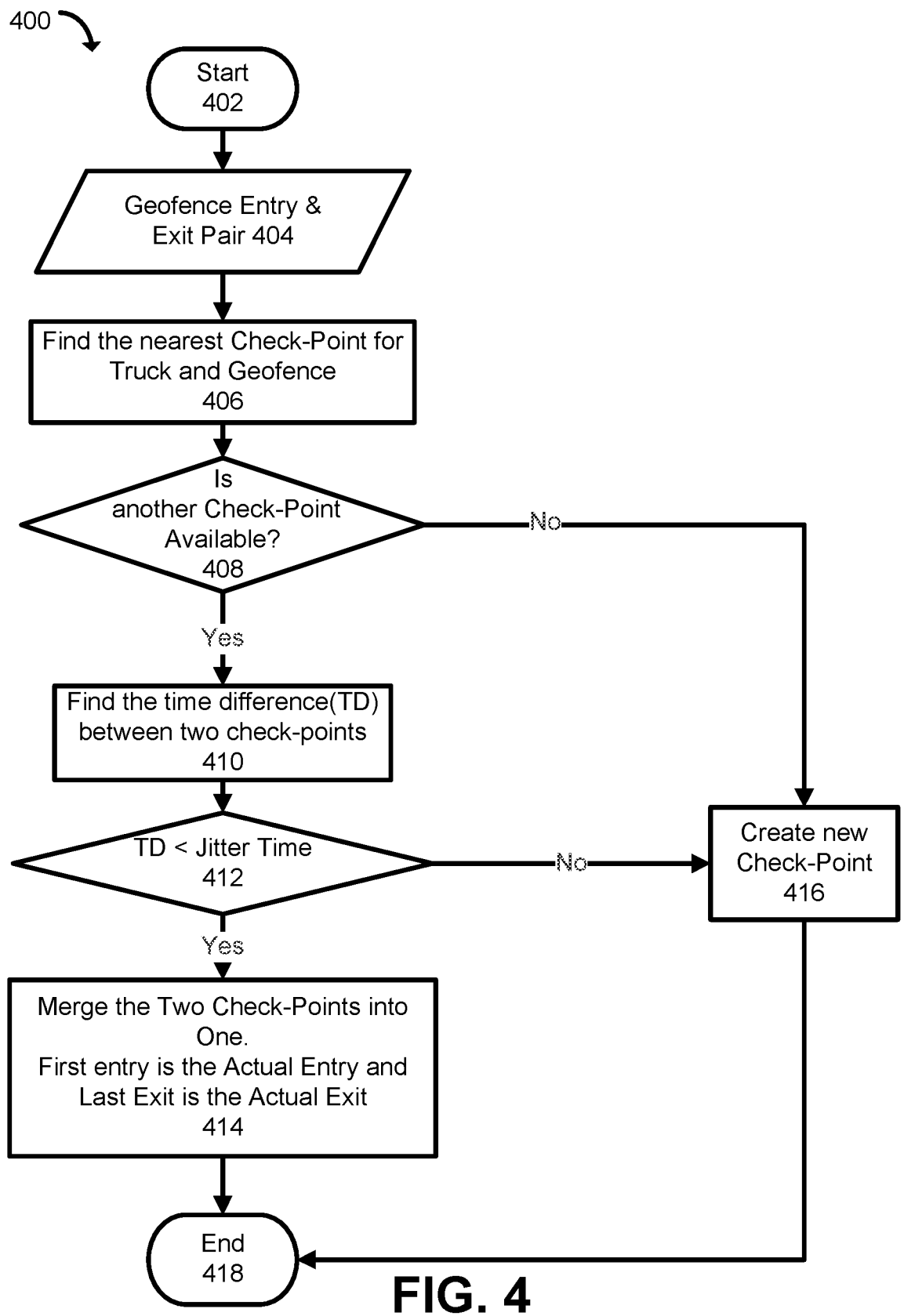
FIG. 4 is a flowchart illustrating an example method a processor may use to filter out false checkpoint detections caused, for example, by a haul-truck hovering near a geofence.

FIG. 4 is a flowchart illustrating an example method a processor may use to filter out false positive checkpoint detections caused, for example, by a haul-truck hovering near a geofence. For example, the haul-truck may be waiting in line to enter a material plant such as the material plant surrounded by the material plant geofence 104 or the haul-truck may be waiting in line to deliver material to a machine. The process 400 begins at 402. At 404, the processor finds an entry/exit pair for a material plant geofence (such as the plant geofence 104) or a machine geofence (such as the machine geofence 106). At 406, the processor finds the nearest checkpoint for the haul-truck and a geofence. At 408, the processor determines if another/additional checkpoint is available (i.e., has been detected and recorded).

At 410, if the processor has determined another checkpoint is available, then the processor determines the time difference between the two checkpoints, such as by determining a difference between the first exit and the second entrance. At 412, the processor determines if the time difference is less than a jitter time. The jitter time is a time that may be specified such as, for example, 20% of an average time spent inside a geofence by haul-trucks in general, from time of geofence entry to time of geofence exit. This is just an example, and other specifications for the jitter time may be utilized. One example reason a time difference may be less than the jitter is that the haul-truck is waiting in line to enter the material plant geofence 104. The received GPS position signal has some inaccuracies. For example, the received GPS position signal may be accurate to within 25.6 feet with 95% probability. Furthermore, a GPS signal may sometimes be degraded, such as by obstructions or multipath reflection. As the haul truck is waiting in line, the received locations for the haul-truck may actually indicate the haul truck is within the material plant geofence 104 and then outside the material plant geofence, even though the haul-truck remains outside the material plant geofence 104 and has not yet entered the material plant geofence 104 since the last actual checkpoint.

At 414, if it has been determined that the time difference is less than the jitter time, then the two checkpoints are merged into one, with the first entry being recorded as the actual entry for the merged checkpoint and the last exit being recorded as the actual exit for the merged checkpoint. In this way, geofence crossings that have a high probability of being false positives are detected and disregarded. Thus, for example, a "false" exit while waiting to leave may be ignored, such that the actual exit is used in cycle time determination.

At 416, if it has been determined that the time difference is not less than the jitter time, then a new checkpoint is created at 416 using the geofence entry and exit pair determined at 404.

Figure 5:
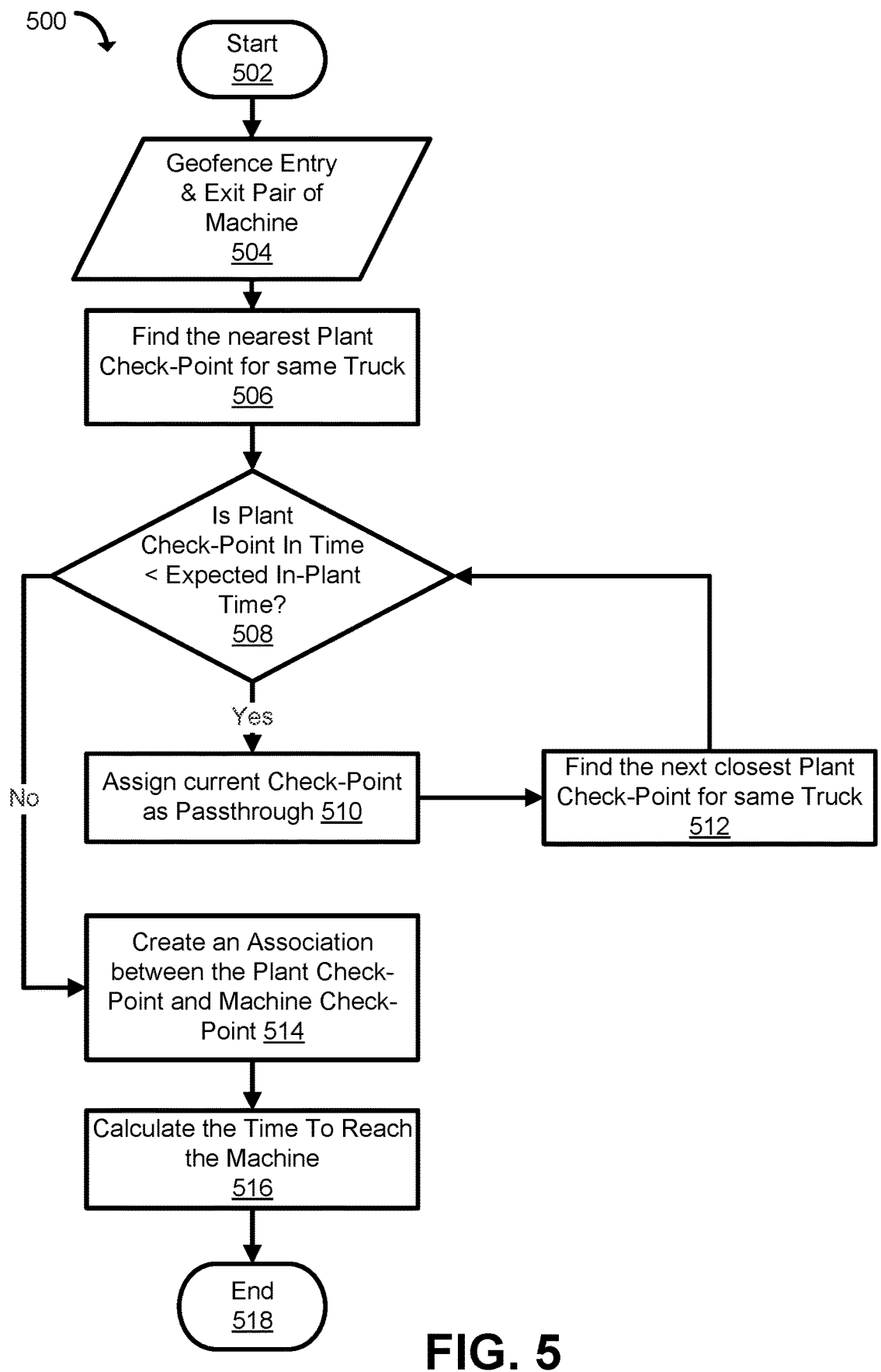
FIG. 5 is a flowchart illustrating an example method a processor may use to filter out a false checkpoint detection caused, for example, by a haul-truck passing near a plant geofence.

FIG. 5 is a flowchart illustrating an example method a processor may use to filter out a false checkpoint detection caused, for example, by a haul-truck passing near a plant geofence. For example, the haul-truck may be in transit to a machine (e.g., the machine surrounded by the machine geofence 106) and may pass close enough to another material plant that the processor, using received position signals, may erroneously determine that the haul-truck entered and exited a geofence surrounding the other material plant.

The process 500 begins at 502. At 504, the processor finds an entry/exit pair for a machine geofence (such as the machine geofence 106). At 506, the processor finds the nearest checkpoint for the haul-truck and a plant geofence.

At 508, the processor determines if an in-plant time for the checkpoint found at 506 is less than an expected in-plant time. The in-plant time for the checkpoint may be, for example, a time difference between the entry of the haul-truck to the plant geofence and the exit of the haul-truck from the plant geofence. The expected in-plant time may be, as just examples, set at two minutes or set at 20% of the average time a haul-truck spends within a plant geofence. For example, as the haul-track passes by a plant geofence, due to inaccuracies in the position signal received by the processor, the position signal may inaccurately indicate that the haul-truck has entered and then exited a geofence surrounding the plant.

At 510, if it has been determined that the plant checkpoint time in-time is less than the expected in-plant time, the current checkpoint is given a status of "passthrough" such that it is not used for determining haul-truck cycle time. At 512, the next closest plant check-point for the same haul-truck is found, for which the processor makes the determination at 508.

At 514, if it has been determined that the plant checkpoint time in-time is not less than the expected in-plant time, the processor creates an association between the plant checkpoint and the machine checkpoint. At 516, the processor calculates the time from plant geofence exit to the entry to the machine geofence. At 518, the process 500 ends.

Figure 6:
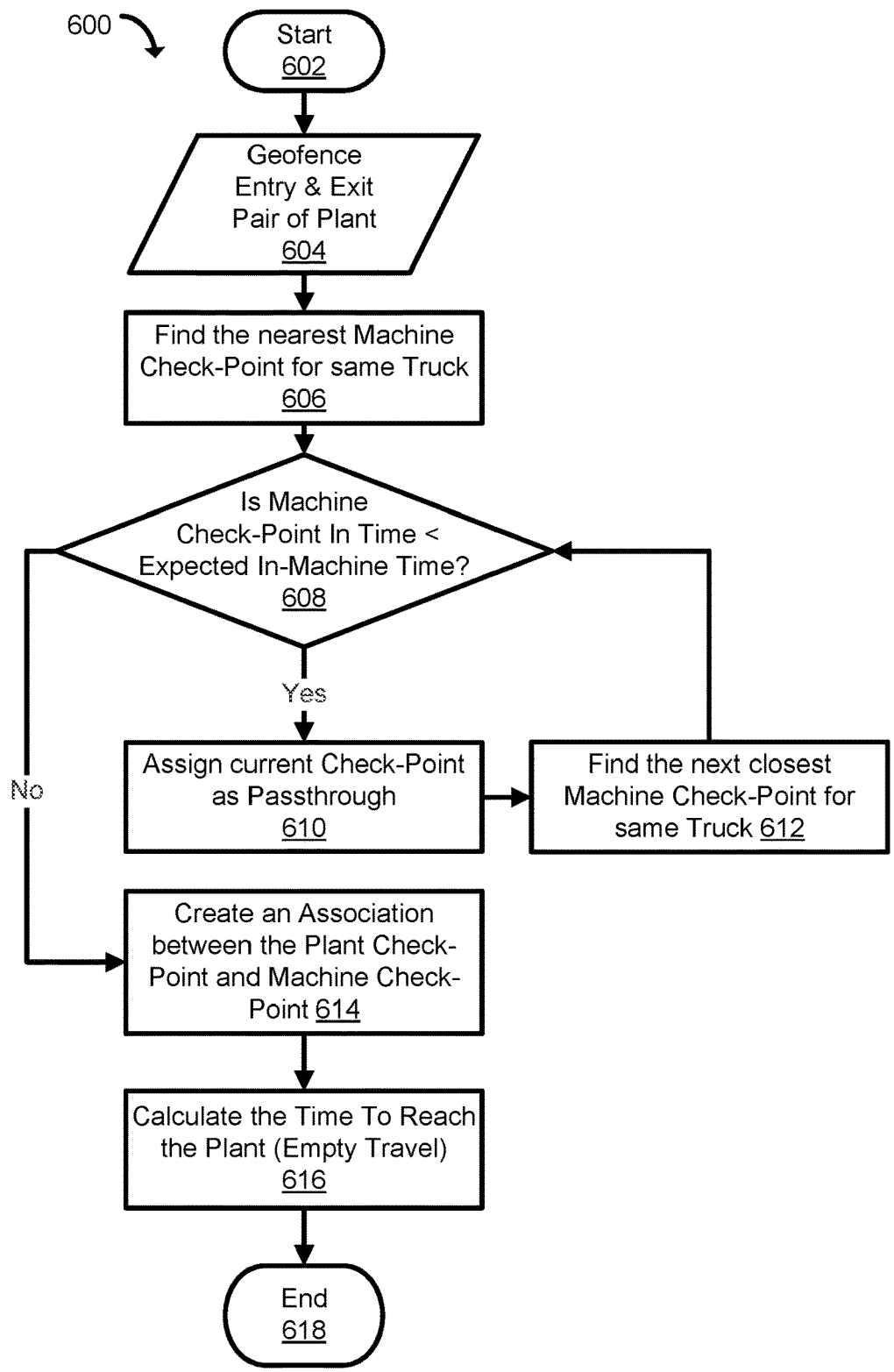
FIG. 6 is a flowchart illustrating an example method a processor may use to filter out a false checkpoint detection caused, for example, by a haul-truck passing near a machine geofence.

FIG. 6 is a flowchart illustrating an example method a processor may use to filter out a false checkpoint detection caused, for example, by a haul-truck passing near a machine geofence. For example, the haul-truck may be in transit to a machine (e.g., the machine surrounded by the machine geofence 106) and may pass close enough to another machine that the processor, using position signals, may erroneously determine that the haul-truck entered and exited a geofence surrounding the other machine.

The process 600 begins at 602. At 604, the processor finds an entry/exit pair for a machine geofence (such as the machine geofence 106). At 606, the processor finds the nearest checkpoint for the haul-truck and a plant geofence.

At 608, the processor determines if the in-machine time for the checkpoint found at 606 is less than an expected in-machine time. The in-machine time for the checkpoint may be, for example, a time difference between the entry of the haul-truck to the machine geofence and the exit of the haul-truck from the machine geofence. The expected in-machine time may be, as just examples, set at two minutes or set at 20% of the average time a haul-truck spends within a machine geofence. For example, as the haul-track passes by a machine geofence, due to inaccuracies in the position signal received by the processor, the position signal may inaccurately indicate that the haul-truck has entered and then exited a geofence surrounding the machine.

At 610, if it has been determined that the machine checkpoint time in-time is less than the expected in-machine time, the current checkpoint is given a status of "pass-through" such that it is not used for determining haul-truck cycle time. At 612, the next closest machine check-point for the same haul-truck is found, for which the processor makes the determination at 608.

At 614, if it has been determined that the machine checkpoint time in-time is not less than the expected in-machine time, the processor creates an association between the plant checkpoint (604) and the machine checkpoint. At 616, the processor calculates the time from the machine geofence exit to the entry to the plant geofence. At 618, the process 600 ends.

Figure 7:
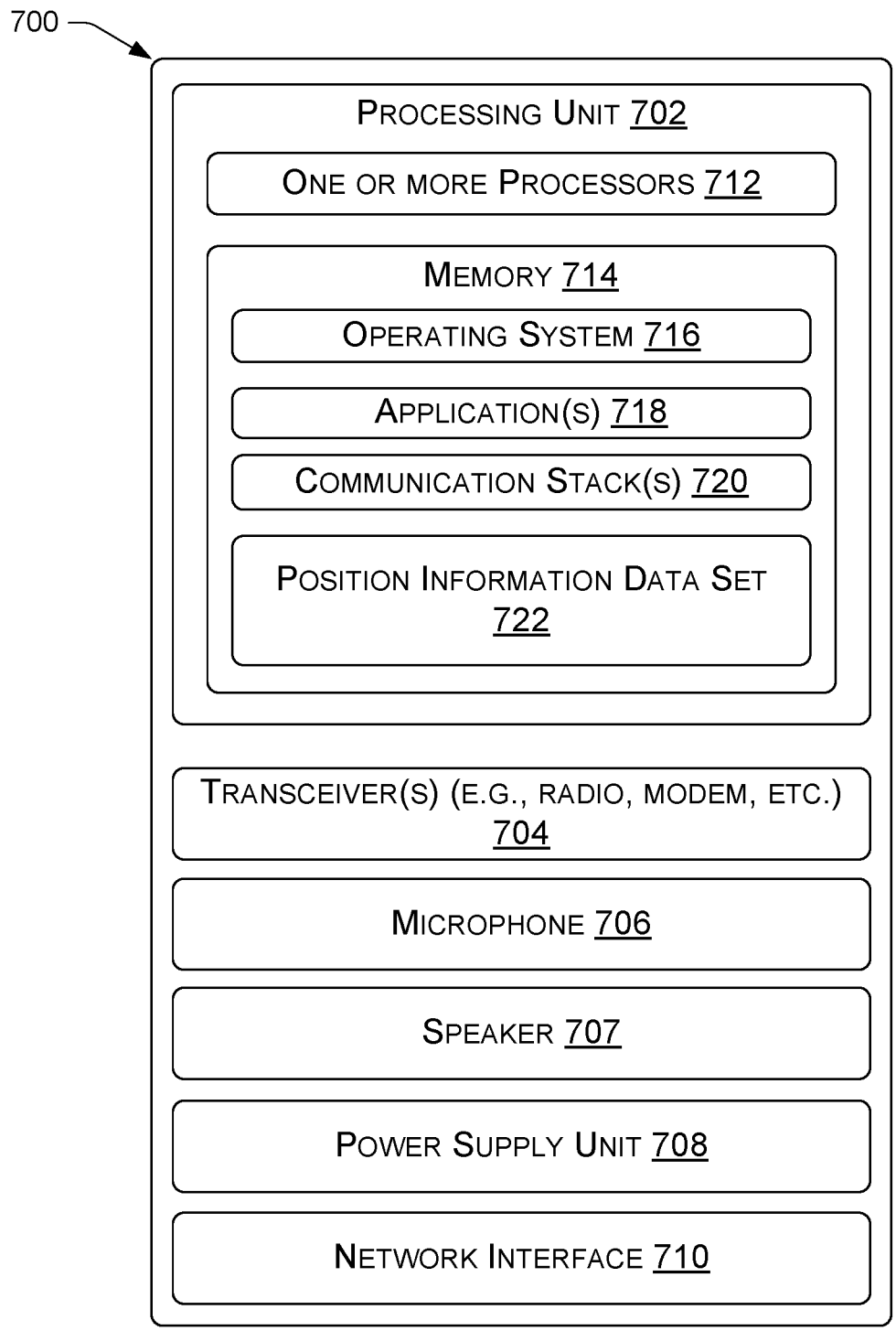
FIG. 7 is a block diagram schematically representing a control system associated with the techniques disclosed herein.

FIG. 7 schematically illustrates components of an example computing device 700 that may comprise a computing device for receiving and processing haul-truck position indications as well as determining haul-truck cycle time. The example computing device 700 may comprise any type of device, such as a mobile phone or other mobile computing device (e.g., a tablet computing device), a personal computer such as a desktop computer or laptop computer, a portable navigation device, gaming device, portable media player. television, set-top box, automated teller machine, and so forth. In some examples, the computing device 700 is a computing device that also performs functionality for the haul-truck, other than functionality used in determining haul-truck cycle time. For example, the computing device 700 may be part of a haul-truck's navigation system, a haul-truck's engine control system, a haul-truck's entertainment system or other system of the vehicle. In some examples, the computing device 700 is a specialized device configured specifically for haul-truck cycle times and, in other examples, the computing device 700 may perform other functionality as well.

As shown in FIG. 7, an example computing device 700 may include at least one of a processing unit 702, a transceiver 704 (e.g., radio, modem, etc.), a microphone 706, a speaker 707, power supply unit 708, and a network interface 710. The network interface may be usable to receive signals that include a position indication, such as a GPS signal. The processing unit 702 may include one or more processors 712 and memory 714. The one or more processors 712 may comprise microprocessors, central processing units, graphics processing units, or other processors usable to execute program instructions to implement the functionality described herein. Additionally, or alternatively, in some examples, some or all of the functions described may be performed in hardware, such as an application specific integrated circuit (ASIC), a gate array, or other hardware-based logic device.

The transceiver 704 may comprise one or more hardware and/or software implemented radios to provide two-way RF communication with other devices in a network. The transceiver 704 may additionally or alternatively include a modem or other interface device to provide wired communication from the computing device 700 to other devices.

The microphone 706 may comprise physical hardware though, in some cases, an audio input interface may instead be provided to interface to an external microphone or other sound receiving device. Similarly, the speaker 707 may comprise physical hardware though, in some cases, an audio output interface may instead be provided to interface to an external speaker or other sound emitting device. The power supply unit 708 may provide power to the computing device 700. In some instances, the power supply unit 708 comprises a power connector that couples to an Alternating Current (AC) or Direct Current (DC) mains power line. In other instances, such as when the computing device 700 is a mobile phone or other portable device, the power supply unit 708 may comprise a battery.

The memory 714 may include an operating system (OS) 716 and one or more applications 718 that are executable by the one or more processors 712. The memory 714 may also store other information. For example, the memory 714 may store a position information data set 722 (which may comprise a data structure like the data structure 200) whose contents may be processed to determine a haul-truck cycle time.

While detailed examples of certain computing devices (e.g., the example computing device 700) are described herein, it should be understood that those computing devices may include other components and/or be arranged differently. As noted above, in some instances, a computing device may include one or more processors and memory storing processor executable instructions to implement the functionalities they are described as performing. Certain computing devices may additionally or alternatively include one or more hardware components (e.g., application specific integrated circuits, field programmable gate arrays, systems on a chip, and the like) to implement some or all of the functionalities they are described as performing.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A method, comprising:
    recording, by a processor of a computing device, a plurality of position transitions of a first vehicle of a plurality of vehicles each in a column of a data structure, wherein the plurality of position transitions are associated with travel of the first vehicle between a machine and a material plant;
    finding, by the processor, a first checkpoint comprising a non-nearest pair of position transitions corresponding to exiting and entering a first geofence associated with the machine, the first geofence comprising a first boundary;
    finding, by the processor, a second checkpoint comprising a nearest pair of position transitions corresponding to entering and exiting a second geofence associated with the material plant, the second geofence comprising a second boundary that is outside of the first boundary;
    determining, by the processor, that a time difference between the position transitions of the second checkpoint is less than an expected time;
    marking, by the processor, the position transitions of the second checkpoint in corresponding columns of the data structure;
    determining, by the processor, a vehicle cycle time for the first vehicle based on time differences between position transitions in the data structure excluding the marked position transitions; and
    controlling, by the processor and based on the vehicle cycle time, the first vehicle and a second vehicle of the plurality of vehicles to travel between the machine and the material plant.

2. The method of claim 1, wherein the plurality of position transitions are determined based on periodically received GPS signals.

3. The method of claim 1, wherein the data structure is a dynamic linked list.

4. The method of claim 1, wherein the position transitions of the first checkpoint span a time encompassing the position transitions of the second checkpoint.

5. The method of claim 1, further comprising:
    determining, by the processor, that a time difference between the position transitions of the second checkpoint is not less than an expected time; and
    associating, by the processor, the first checkpoint and the second checkpoint.

6. The method of claim 1, wherein the first geofence comprises a dynamic geofence, and the first machine comprises a machine in motion.

7. The method of claim 1, further comprising:
    determining, by the processor, a second vehicle cycle time for the first vehicle based on a difference between:
        a first time indicated in a first ticket associated with the first vehicle and a third checkpoint, and
        a second time indicated in a second ticket associated with the first vehicle and a fourth checkpoint.

\* \* \* \* \*